United States Patent
Bouchez et al.

(10) Patent No.: US 8,482,230 B2
(45) Date of Patent: Jul. 9, 2013

(54) ELECTRIC DEVICE FOR DRIVING MECHANICAL EQUIPMENT AND ASSOCIATED METHOD

(75) Inventors: Boris Bouchez, Cergy le Haut (FR); Luis de Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 198 days.

(21) Appl. No.: 13/165,135

(22) Filed: Jun. 21, 2011

(65) Prior Publication Data

US 2011/0316462 A1 Dec. 29, 2011

(51) Int. Cl.
- H02P 11/06 (2006.01)
- H02P 3/14 (2006.01)
- H02P 3/18 (2006.01)

(52) U.S. Cl.
USPC .......... 318/376; 318/377; 318/378; 318/440; 318/500; 318/379; 320/107; 320/166; 320/167; 320/127; 320/128; 320/137; 320/163; 320/121; 363/17; 363/34; 363/36; 180/65.31; 180/65.275

(58) Field of Classification Search
USPC ............... 320/107, 166, 167, 127, 128, 137, 320/163, 121; 318/139, 376, 377, 378, 379, 318/440, 500; 363/17, 34, 36; 180/65.31, 180/65.275
See application file for complete search history.

(56) References Cited

U.S. PATENT DOCUMENTS

| | | | |
|---|---|---|---|
| 3,849,714 A | | 11/1974 | Mattson et al. |
| 4,218,643 A | * | 8/1980 | Herald et al. ............... 318/696 |
| 6,788,029 B1 | * | 9/2004 | Gabrys ............................ 322/4 |
| 8,248,006 B2 | * | 8/2012 | Klatt ........................ 318/400.01 |
| 8,373,381 B2 | * | 2/2013 | Raiser et al. ................... 320/101 |
| 2005/0275983 A1 | | 12/2005 | Franklin et al. |
| 2007/0096564 A1 | * | 5/2007 | Maeda ............................. 307/87 |
| 2008/0074905 A1 | * | 3/2008 | Moiseev et al. ................ 363/20 |
| 2009/0033274 A1 | | 2/2009 | Perisic et al. |
| 2009/0109713 A1 | * | 4/2009 | Schnetzka et al. ............. 363/34 |
| 2010/0123426 A1 | * | 5/2010 | Nashiki et al. ................ 318/701 |

FOREIGN PATENT DOCUMENTS

| | | |
|---|---|---|
| DE | 21 09 026 A1 | 8/1972 |
| EP | 1 241 041 A1 | 9/2002 |
| EP | 1 764 256 A2 | 3/2007 |

OTHER PUBLICATIONS

French Search Report issued in the corresponding French application No. 1055095, mailing date Mar. 30, 2011 (2 pages).

* cited by examiner

*Primary Examiner* — Rita Leykin
(74) *Attorney, Agent, or Firm* — Osha Liang LLP

(57) ABSTRACT

The present invention relates to an electric device for driving mechanical equipment comprising an alternating current motor and an inverter, the said inverter comprising, for each phase of the said motor, an H bridge structure comprising four switching elements distributed over two branches connecting two terminals of the said H bridge structure and intended to supply the winding of the said at least one phase of the motor, the said winding being a winding with a mid point and the said electric device being characterized in that it also comprises, for each phase of the said motor, an energy storage unit, in particular a supercondenser, connected, on the one hand, to the mid point of the winding of the concerned phase of the motor and, on the other hand, to a terminal of the H bridge structure supplying the said winding.

17 Claims, 4 Drawing Sheets

ELECTRIC DEVICE FOR DRIVING MECHANICAL EQUIPMENT AND ASSOCIATED METHOD

The present invention relates to the field of electric devices intended to drive mechanical equipment, for example motor vehicles, using an electric motor and making it possible to retrieve a portion of the energy supplied by the mechanical equipment in certain circumstances, for example during braking, also called regenerative braking, in the case of a motor vehicle.

In the prior art, electric motors are supplied by high-voltage rechargeable batteries 1 delivering direct current to an inverter 3 which converts this direct current into an alternating current making it possible to supply an electric motor 5, the latter putting the mechanical equipment into motion, as shown in FIG. 1.

Moreover, the functioning of the electric motors 5, generally asynchronous three-phase motors as shown in FIG. 1, also makes it possible to use the mechanical energy not used by the mechanical equipment as a generator for recharging the batteries 1. However, in particular during urban journeys, vehicles carry out brief and sudden brakings producing a great amount of energy over a short time and repetitively over the course of time. The intense currents created are not accepted by the batteries 1 of the prior art and the transient conditions thus created can result in a premature wearing out of these batteries 1.

In order to overcome this problem a solution of the prior art consists in the use of supercondensers in order to store the energy retrieved during braking as described in the patent EP 1 241 041. FIGS. 2 to 5 show examples of configuration according to the prior art in which supercondensers are used in the electrical supply circuits of electric motors 5.

In FIG. 2, the supercondenser 7 is connected in parallel with the battery 1. The problem in such a configuration is that the management of the energy between the battery and the supercondenser cannot be controlled. Thus, the supercondenser cannot be discharged to zero volts or charged to a voltage higher than that of the battery, which limits the use of the capacity of the supercondenser and therefore restricts its advantage.

In order to overcome this problem, one possibility is to introduce a direct current to direct current (DC-DC) converter 9 allowing independent management of the supercondenser such as shown in FIG. 3. However, such a configuration is expensive because of the cost of the direct current to direct current converter 9.

Some power supply circuits already have a voltage boost converter 11 upstream of the inverter 3. This configuration allows an optimization of the power supply circuit because the power supply of the inverter 3 is controlled. Thus the idea is to place the supercondenser 7 at the output of the voltage boost converter 11 as shown in FIG. 4. However, this creates dependence between the power supply voltage of the inverter 3 and the charge state of the supercondenser 7. Thus, when the power supply voltage of the inverter 3 is low, as is the case for example at low speed, the supercondenser 7 is therefore forced to discharge. Moreover, the supercondenser 7 would not be able to become completely discharged. These disadvantages can be overcome by the addition of a direct current to direct current (DC-DC) converter 9 as shown in FIG. 5 but in this case, as for the configuration shown in FIG. 3, the cost of the converter 9 is very high.

The necessity is therefore to propose a simple and inexpensive embodiment making it possible to overcome the aforesaid disadvantages of the prior art and in particular to allow an optimized use of the capacity of supercondensers 7 for the retrieval of energy from the electric motors 5.

Thus, exemplary embodiments of the present invention provide an electric device for driving mechanical equipment comprising an alternating current motor and an inverter, the said inverter comprising, for each phase of the said motor, an H bridge structure comprising four switching elements distributed over two branches connecting two terminals of the said H bridge structure and intended to supply the winding of the said at least one phase of the motor, the said winding being a winding with a mid point and the said electric device also comprising, for each phase of said motor, at least one energy storage unit, in particular a supercondenser, connected, on the one hand, to the mid point of the winding of the concerned phase of the motor and, on the other hand, to a terminal of the H bridge structure supplying the said winding.

Other exemplary embodiments of the invention provide an electric device for driving mechanical equipment comprising an alternating current motor and an inverter, the said inverter comprising, for each phase of the said motor, an H bridge structure comprising four switching elements distributed over two branches connecting two terminals of the said H bridge structure and intended to supply the winding of the said at least one phase of the motor, the said winding being a winding with a mid point;
the electric device further comprising at least one energy storage unit, in particular a supercondenser, connected on the one hand to at least one phase of the motor via the mid-point of the winding of said phase and on the other hand to a terminal of the H bridge structure supplying the said winding.

The device may comprise a single energy storage unit, in particular a single supercondenser, connected, in particular directly connected, on the one hand, to the mid point of the winding of each phase of the motor and, on the other hand, to the said terminal of the H bridge structure supplying the said winding.

As a variant, the device may comprise an energy storage unit for each phase, in particular a supercondenser, connected on the one hand to the mid point of the winding of the said phase of the motor and on the other hand to the said terminal of the H bridge structure supplying the said winding.

The terminal of the H bridge structure to which the energy storage unit, as the case may be the supercondenser, is connected may correspond to the terminal connected to the earth potential.

The supercondenser is for example a condenser having a power density of between 1000 and 5000 W/kg and/or an energy density of between 4 and 6 Wh/kg.

The supercondenser may be an electrochemical double layer supercondenser.

According to a first example embodiment of the invention, the motor is supplied by a fuel cell. The fuel cell may be part of the electric device.

According to this first example of embodiment of the invention, during the transient conditions corresponding to switching off the power supply of the motor, the energy supplied by the fuel cell may be stored in the storage unit, in particular the supercondenser.

According to a second example or embodiment of the invention, the electric device also comprises accumulation means making it possible to supply the motor and means of control of the inverter configured to allow on the one hand the charging of the energy storage unit, in particular of the supercondenser, during the braking phases of the vehicle and on the other hand the discharging of the energy storage unit, in particular of the supercondenser, into the motor during acceleration phases and/or into the accumulation means in order to charge the accumulation means.

According to this second embodiment of the present invention, the accumulation means may comprise a battery.

A switching element, in particular each switching element, may comprise a transistor and a diode connected in parallel.

The transistor may be an insulated gate bipolar transistor.

The alternating current motor may be a three-phase motor.

Each terminal of each phase of the motor may be connected to switching elements of the H bridge, each phase of the motor corresponding to the load of the H bridge.

All of the H bridges of the device may or may not be identical.

Other exemplary embodiments of the invention provide a method of retrieving the electrical energy produced by an electric motor of a motor vehicle each phase of which comprises a winding with a mid point and is supplied by an H bridge structure, in which, during braking phases of the said vehicle, the switching elements of the H bridge structure are controlled in such a way as to retrieve the electrical energy produced in at least one energy storage unit, in particular a supercondenser, connected between at least one phase of the motor, in particular one or three phases, via the mid point of the winding of said phase and a terminal of the H bridge structure corresponding to the base of the branches of the H bridge structure.

According to other exemplary embodiments of the present invention, when the energy storage unit, in particular the supercondenser, is charged, the elements of the H structure are controlled in such a way as to discharge a portion of the energy of the energy storage unit, in particular of the supercondenser, into a battery.

Other exemplary embodiments provide a method of retrieving the electrical energy stored in at least one energy storage unit, in particular a supercondenser, to a motor vehicle electric motor of which each phase comprises a winding with a mid point and is supplied by an H bridge structure in which, during acceleration phases of the said vehicle, the switching elements of the H bridge structure are controlled in such a way as to use, by priority, the energy stored in the energy storage unit, in particular in the supercondenser, which is connected between at least one phase of the motor, in particular one or three phases, via the mid point of the winding of said phase and a terminal of the H bridge structure corresponding to the base of the branches of the H bridge structure.

The energy storage unit or units may be other than supercondensers, for example lithium-ion batteries.

Other features and advantages of the invention will appear in its description which will now be given, with reference to the appended drawings which show a possible embodiment of it in an indicative but non-limiting manner.

The general designations below are used in the following description:

The term "Insulated Gate Bipolar Transistor (IGBT)" corresponds to a hybrid transistor having a Metal Oxide Semiconductor Field Effect Transistor (MOSFET) input and a bipolar transistor output.

Figure 1:
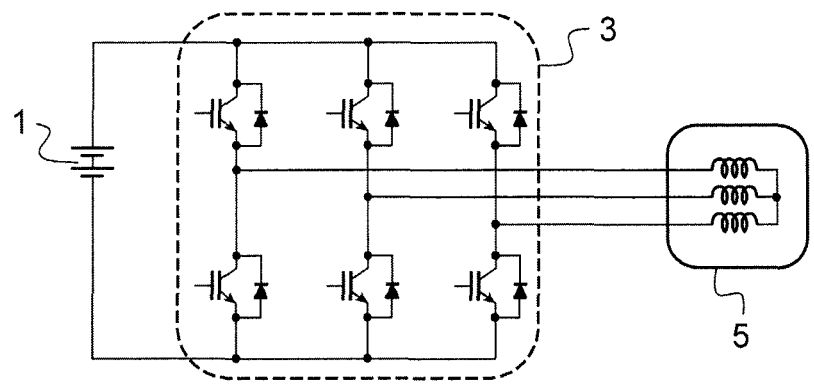
FIG. 1 shows an example embodiment of a circuit diagram of an electric power supply circuit according to the prior art.
Figure 2:
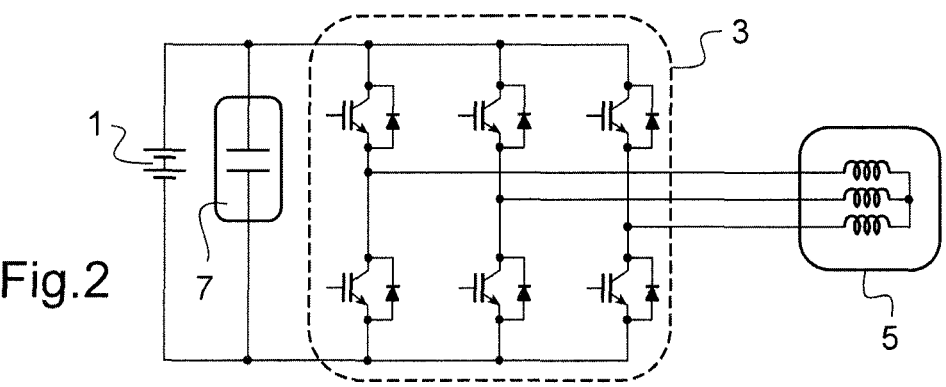
FIG. 2 shows a first example embodiment of a circuit diagram of an electric power supply circuit using a supercondenser according to the prior art.
Figure 3:
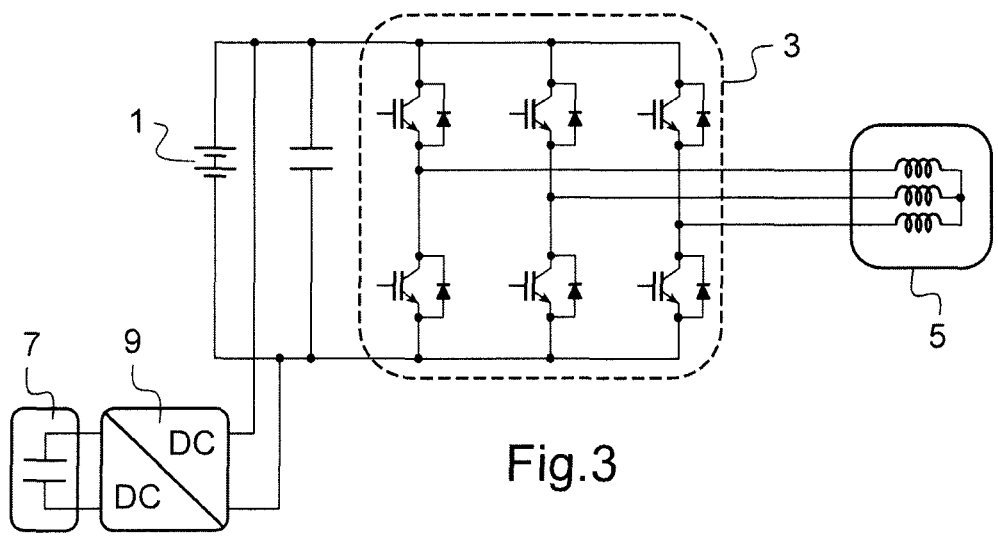
FIG. 3 shows a second example embodiment of a circuit diagram of an electric power supply circuit using a supercondenser according to the prior art.
Figure 4:
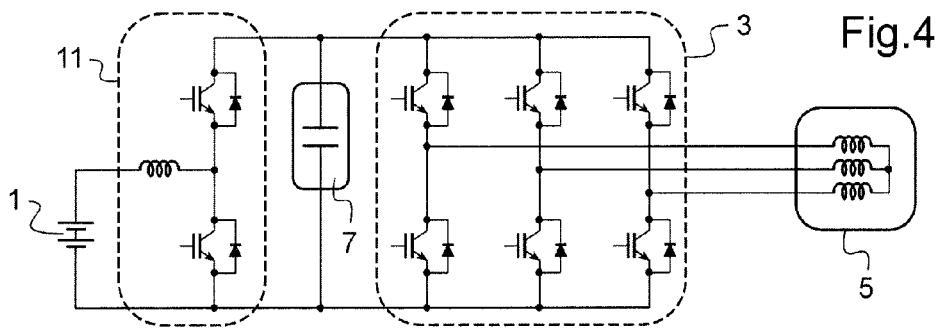
FIG. 4 shows a third example embodiment of a circuit diagram of an electric power supply circuit using a supercondenser according to the prior art.
Figure 5:
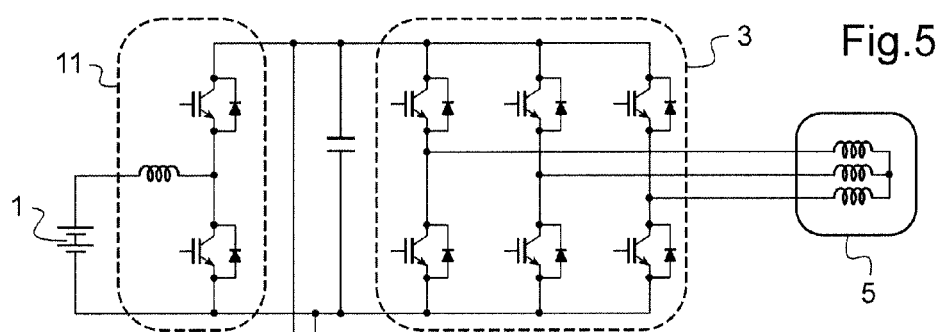
FIG. 5 shows a fourth example embodiment of a circuit diagram of an electric power supply circuit using a supercondenser according to the prior art.
Figure 6:
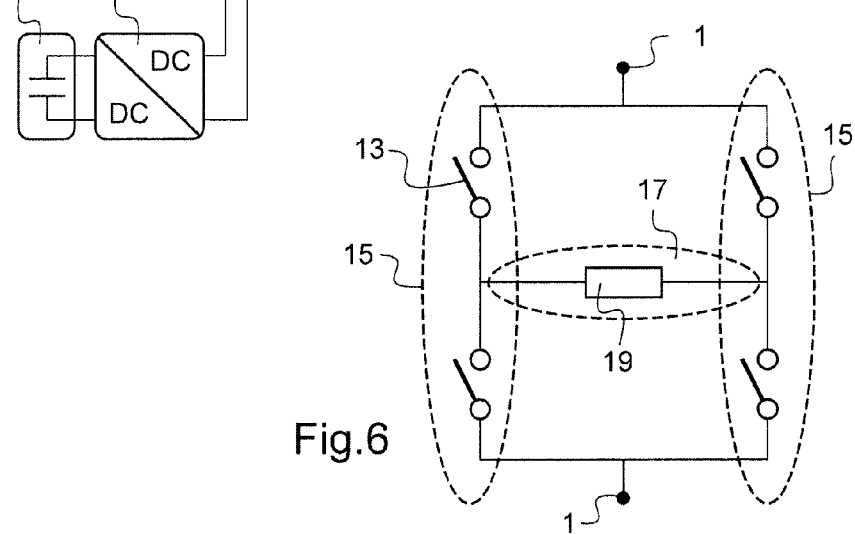
FIG. 6 shows an H bridge structure.
Figure 8:
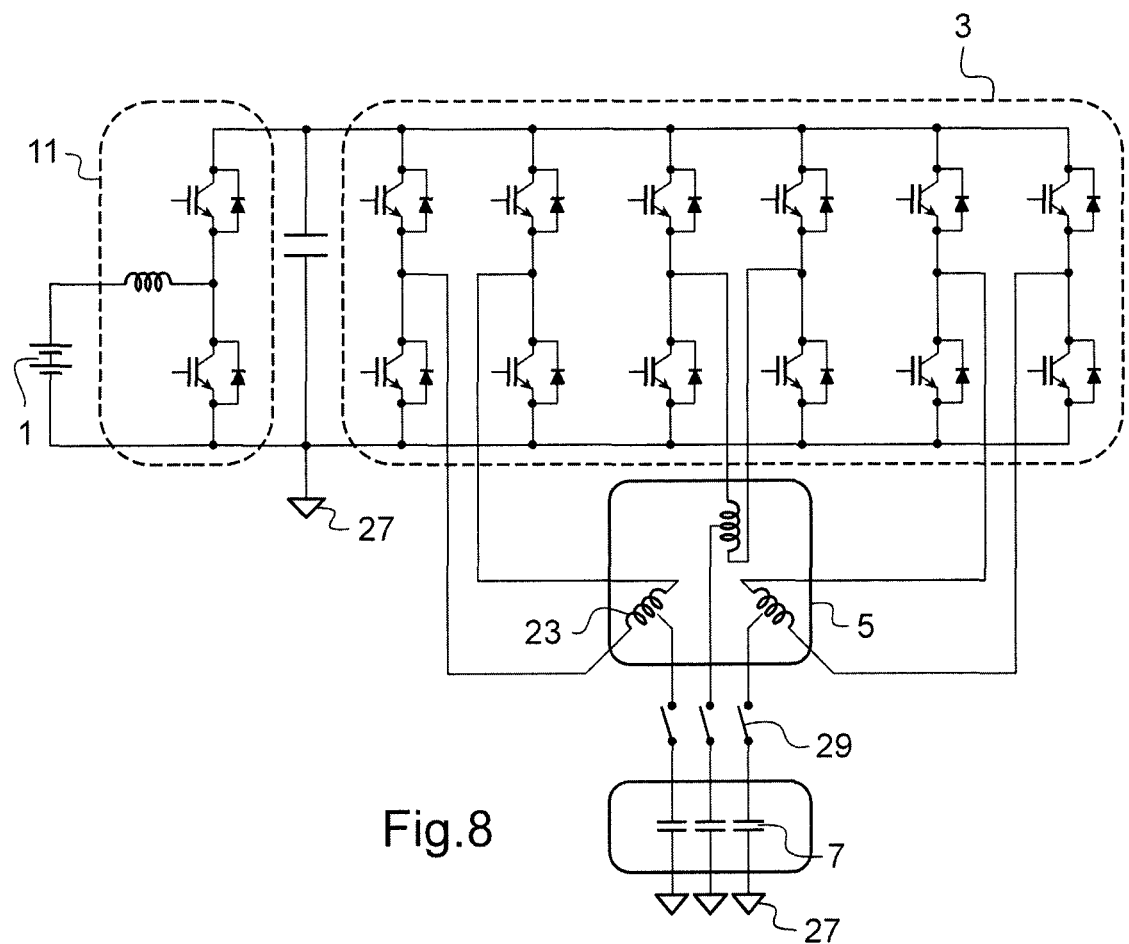
FIG. 8 shows a first embodiment of the present invention.
Figure 9:
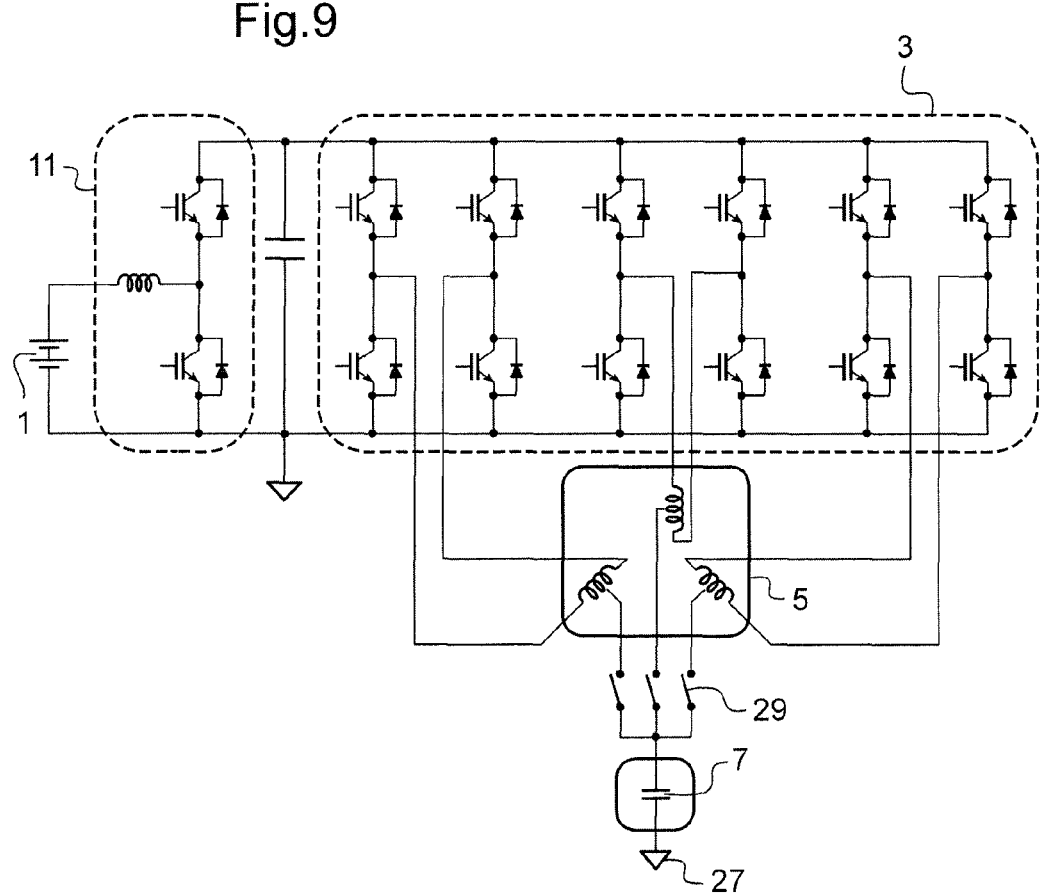
FIG. 9 shows a second embodiment of the present invention.

The term "H bridge structure" or "H bridge" corresponds to an electric or electronic circuit comprising four switching elements 13 generally disposed symmetrically in an H shape as shown in FIG. 6, the two vertical branches 15 of the H each comprising two switching elements 13 disposed on either side of the horizontal branch 17 of the H which corresponds to the load 19 of the bridge. In the case of the present invention, this load 19 corresponds to the winding of a phase of an electric motor 1. Moreover, the two vertical branches 15 are connected at their ends to the two terminals 21 of the bridge. The switching elements are generally embodied by a transistor connected in parallel with a diode as shown in FIGS. 8 and 9, the transistor generally being an insulated gate bipolar transistor.

The term "supercondenser" corresponds to a high-capacity condenser generally produced using the double electrochemical layer method in which two porous electrodes, generally made of activated carbon and impregnated with electrolyte, are separated by a membrane which is insulating and porous (in order to ensure ionic conduction). This allows an intermediate power and power density between batteries and conventional condensers and a faster energy retrieval speed than batteries.

Figure 7:
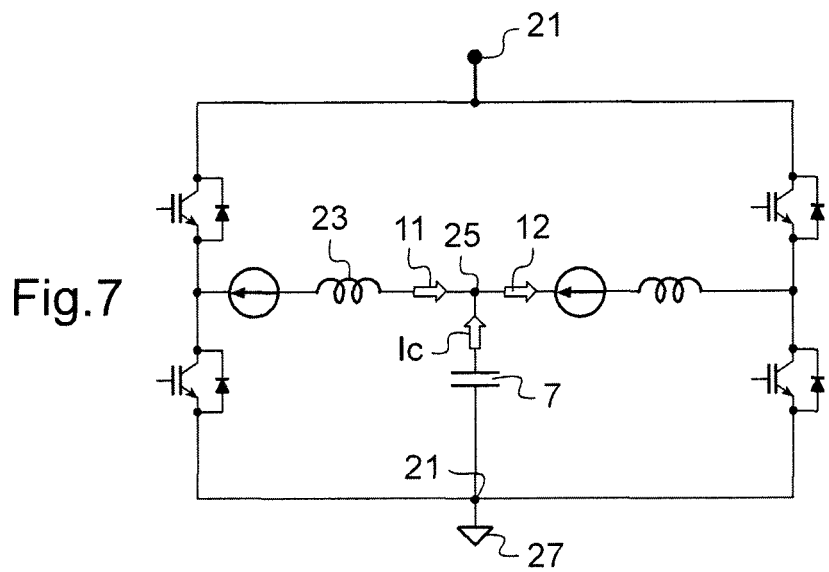
FIG. 7 shows an H bridge structure according to an embodiment of the present invention.

The embodiments of the present invention consist in using an electric motor 5 whose winding 23 of the at least one phase is a winding with a mid point and a power supply circuit of the electric motor whose inverter uses at least one H bridge structure for supplying the at least one phase, an energy storage unit 7 being connected between the mid point 25 of the winding and the terminal 21 of the H bridge corresponding to the earth 27 such as shown in FIG. 7. In this case, the winding 23 of the electric motor 5 becomes the load 19 of the H bridge.

In the examples described, the energy storage unit or units 7 are supercondensers but the invention is not limited to such an example.

The present invention applies to motors 5 comprising any number of phases although, in the continuation of the description, three-phase motors will be described in order to illustrate the invention, these motors being commonly used in particular in the field of electric motor vehicles.

FIG. 8 shows a first embodiment of a power supply circuit of a three-phase electric motor in which a battery or fuel cell 1 is connected to an inverter 3 by the intermediary of a step-up circuit 11, the inverter 3 comprising three H bridge structures intended to supply the three phases of the electric motor 5 represented by their winding 23. For each of the three phases, a supercondenser 7 is connected between the mid point of the winding 23 and the earth potential 27 of the power supply circuit. Moreover, switches 29, placed between the mid points 25 of the windings and the supercondensers 7, make it possible to control the connection of the supercondensers 7.

According to a second embodiment, the mid points of the windings 23 of the three phases are connected to a single supercondenser 7 as shown in FIG. 9.

Thus, with the embodiments shown in FIGS. 8 and 9, the charging or discharging current of the supercondenser 7, even though passing through the phases of the motor 5, does not disturb the functioning of the motor 5. In fact, if the currents flowing in the half-windings of the phases are equal, they generate magnetomotive forces which compensate each other and there is therefore no creation of torque.

The control means of the current of the inverter 3 should therefore manage the equitable sharing of the charge and discharge currents of the supercondensers 7.

Thus, with these configurations, there is no need for additional converters 9 dedicated to the supercondensers 7, which reduces the cost of the equipment and the supercondenser 7 may be discharged to zero voltage, which allows optimized use.

In order to better understand the embodiments of the present invention, the functioning of the power supply circuit will now be described in detail in the case where the mechanical equipment driven by the electric motor is a motor vehicle; other mechanical equipment however, for example of the wind-driven or hydraulic type, are covered by the present invention.

The functioning essentially consists in controlling, by the intermediary of control means of the inverter 3, the opening and closing of the switching means 13 of the H bridges and of the switches 29 in order to use the supercondensers 7 in an optimal manner.

According to one aspect of the present invention, in static conditions (without acceleration or braking), the voltage at the terminals of the supercondensers 7 is regulated at an intermediate value between zero volts and the value E of the power supply voltage provided by the battery 1, for example E/2.

This intermediate value allows the control means of the inverter 3, in the case of acceleration of the vehicle, to control the discharge of the supercondensers 7 (possibly down to a voltage of zero volts) in order to supply the electric motor 5 which makes it possible to limit the demands on the battery 1 and, in the case of braking, to retrieve the energy provided by the motor 5 (which then acts as a generator) by recharging the supercondensers 7 (possibly up to a voltage E). When the charge of the supercondensers 7 corresponds to a value greater than the intermediate value (E/2 in the present case), the control means bring back the voltage at the terminals of the supercondensers 7 to E/2 by discharging them into the battery 1 (this not being possible in the case of a fuel cell since the electrochemical reaction is irreversible. In this case, the energy retrieved from the braking only allows the recharging of the supercondensers).

Moreover, in the case of a fuel cell, the stopping of the electrical power supply is not immediate, so that when the instruction to stop the power supply of the motor is actuated (in practice, in the case of a motor vehicle, this corresponds to releasing the accelerator), the fuel cell continues to supply energy (transient conditions). Thus, the supercondenser makes it possible to retrieve this energy instead of dissipating it in the form of heat. Thus the energy stored during these transient conditions can be used during the following acceleration.

During an urban journey, for example comprising an alternation of accelerations and brakings, the power supply of the electric motor 5 will be carried out essentially and by priority by the supercondensers 7. Thus, the battery 1 is called upon only very partially during transient conditions, which makes it possible, on the one hand, to reduce the overall electrical consumption and, on the other hand, to reduce the ageing of the battery 1.

Moreover, it is possible to control both the currents of the supercondensers 7 and the currents useful to the motor 5. "Useful" means the currents which generate a magnetomotive force. In fact, by controlling the currents I1 and I2 of the half-winding of a phase of the motor 5, shown in FIG. 7, the useful current Iu and the current flowing in the supercondenser 7 Ic are also controlled, the relationships between the currents being given by the following equations:

$$\begin{cases} I_u = \dfrac{I_1 + I_2}{2} \\ I_c = I_2 - I_1 \end{cases}$$

Figure 10:
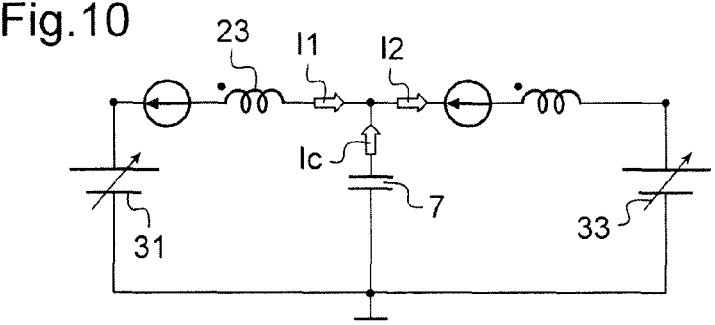
FIG. 10 is an explanatory diagram of the functioning of the H bridge according to an embodiment of the present invention.

The electrical circuit of FIG. 7 can be modelled by an average model in which the branches of the bridge which cut out at high frequency are equivalent to a voltage source which depends on the supply voltage E and on the mean value of the duty cycles $\alpha1$ and $\alpha2$, the values of the duty cycles being included between 0 and 1. The diagram of FIG. 10 is then obtained in which the voltage sources 31 and 33 deliver voltages $\alpha1.E$ and $\alpha2.E$ respectively.

The currents I1 and I2 are therefore defined by $$\begin{cases} I_1 = \dfrac{\alpha_1 E - V_c}{Z} \\ I_2 = \dfrac{V_c - \alpha_2 E}{Z} \end{cases}$$

where Vc is the voltage at the terminals of the supercondenser 7 and Z is the impedance of a half-winding.

The values of the currents Iu and Ic are therefore:

$$\begin{cases} I_u = \dfrac{(\alpha_1 - \alpha_2)E}{Z} \\ I_c = \dfrac{(\alpha_1 - \alpha_2)E - 2V_c}{Z} \end{cases}$$

Thus, the useful current to the motor 5 is controlled by the difference of the duty cycles ($\alpha1-\alpha2$) whereas the current in the supercondenser 7 is controlled by the sum of the duty cycles ($\alpha1+\alpha2$). The two values (Iu and Ic) can therefore be controlled independently; there is no coupling between the two.

Thus, according to one embodiment of the present invention, the switching elements 13 of the bridge are controlled by pulse width modulation instructions (PWM) whose duty cycles will be calculated in order to obtain the desired current in the motor 5 and the supercondenser 7.

Thus, the use of a motor 5 whose phase windings 23 are windings having a mid point, of H bridges for supplying the windings 23 and the implementation of a supercondenser 7 between the mid point 25 of the winding 23 and the earth potential 27 of the power supply circuit makes it possible, by the control of the switching elements 13 of the bridge, to use the supercondensers 7, or other energy storage units over the whole of their operating range and in particular allows their complete discharge without using a dedicated voltage converter for each supercondenser 7. This therefore makes it possible to optimize the application of the supercondensers 7 in the power supply circuit and to reduce, on the one hand, the manufacturing costs since no additional converter 11 is necessary and, on the other hand, the operating costs since the electrical consumption of the battery 1 is reduced and its service life is extended by the reduction of the number of charge and discharge cycles particularly in urban driving.

The invention claimed is:

1. An electric device for driving mechanical equipment comprising:
    an alternating current motor;
    an inverter, the inverter comprising, for each phase of the motor, an H bridge structure comprising four switching elements distributed over two branches connecting two terminals of the H bridge structure, wherein one of the two terminals of the H bridge structure is configured to supply the winding of the at least one phase of the motor, the winding being a winding with a mid point; and
    at least one energy storage unit connected to at least one phase of the motor via the mid point of the winding of said at least one phase and to a terminal of the H bridge structure supplying the said winding.

2. The electric device according to claim 1, wherein the terminal of the H bridge structure to which the energy storage unit is connected corresponds to the terminal connected to earth potential.

3. The electric device according to claim 1, the device comprising an energy storage unit for each phase connected to the mid point of the winding of the phase of the motor and to the terminal of the H bridge structure supplying the winding.

4. The electric device according to claim 1, the energy storage unit being an electrochemical double layer supercondenser.

5. The electric device according to claim 1, the motor being supplied by a fuel cell.

6. The electric device according to claim 5, wherein, during transient conditions corresponding to the stoppage of a power supply of the motor, the energy supplied by the fuel cell is stored in the energy storage unit.

7. The electric device according to claim 1, further comprising:
    accumulation means for supplying the motor, and
    means of control of the inverter configured in order to allow the charging of the energy storage unit during braking phases of the vehicle and the discharging of the energy storage unit into the motor during acceleration phases or into the accumulation means to charge the accumulation means.

8. The electric device according to claim 7, the accumulation means comprising a battery.

9. The electric device according to claim 1, the four switching elements comprising a transistor and a diode connected in parallel.

10. The electric device according to claim 9, the transistor being an insulated gate bipolar transistor.

11. The electric device according to claim 1, the alternating current motor being a three-phase motor.

12. A method of retrieving electrical energy produced by an electric motor of a motor vehicle, each phase of which comprises a winding with a mid point and is supplied by an H bridge structure, in which, during braking phases of the vehicle, the method comprising:
    controlling switching elements of the H bridge structure to retrieve the electrical energy produced in at least one energy storage unit
    wherein the at least one energy storage unit is connected between at least one phase of the motor via the mid point of the winding of said at least one phase and a terminal of the H bridge structure corresponding to earth potential of the H bridge structure.

13. The method according to claim 12, wherein, when the at least one energy storage unit is charged, the elements of the H structure are controlled to discharge a portion of the energy of the at least one energy storage unit into a battery.

14. A method of retrieving electrical energy stored in at least one energy storage unit to a motor vehicle electric motor of which each phase comprises a winding with a mid point and is supplied by an H bridge structure, the method comprising:
    during acceleration phases of the said vehicle, controlling switching elements of the H bridge structure to use, by priority, the energy stored in the energy storage unit which is connected between at least one phase of the motor via the mid point of the winding of said phase and a terminal of the H bridge structure corresponding to earth potential of the H bridge structure.

15. The electric device according to claim 1, wherein the at least one energy storage unit is a supercondenser.

16. The method of claim 12, wherein the at least one energy storage unit is a supercondenser.

17. The method of claim 14, wherein the at least one energy storage unit is a supercondenser.

* * * * *